United States Patent [19]
Knoke et al.

[11] Patent Number: 5,581,695
[45] Date of Patent: *Dec. 3, 1996

[54] SOURCE-LEVEL RUN-TIME SOFTWARE CODE DEBUGGING INSTRUMENT

[75] Inventors: Robin L. Knoke, Duvall; Marvin T. Johnson, Bothell, both of Wash.

[73] Assignee: Applied Microsystems Corporation, Redmond, Wash.

[*] Notice: The term of this patent shall not extend beyond the expiration date of Pat. No. 5,228,039.

[21] Appl. No.: 271,568

[22] Filed: Jul. 7, 1994

Related U.S. Application Data

[63] Continuation-in-part of Ser. No. 35,669, Mar. 23, 1993, which is a continuation of Ser. No. 521,261, May 9, 1990, Pat. No. 5,228,039.

[51] Int. Cl.$^6$ ................................................ G06F 11/00
[52] U.S. Cl. .................................................. 395/183.04
[58] Field of Search ........................... 395/575, 183.04; 371/16.1, 16.2, 19

[56] References Cited

U.S. PATENT DOCUMENTS

| | | | |
|---|---|---|---|
| 4,084,869 | 4/1978 | Yen | 339/17 |
| 4,192,451 | 3/1980 | Swerling | 371/16.2 |
| 4,455,654 | 6/1984 | Bhaskar et al. | 371/20 |
| 4,486,827 | 12/1984 | Shima | 364/200 |
| 4,569,048 | 2/1986 | Sargent | 371/16 |
| 4,622,647 | 11/1986 | Sagnard | 371/22.1 X |
| 4,633,417 | 12/1986 | Wilburn | 364/550 |
| 4,661,921 | 4/1987 | Barnes | 364/708 |
| 4,674,089 | 6/1987 | Poret | 371/16.2 |
| 4,691,316 | 9/1987 | Phillips | 371/22.1 X |
| 4,788,683 | 11/1988 | Hester | 371/16.2 |
| 4,796,258 | 1/1989 | Boyce et al. | 371/16 |

(List continued on next page.)

OTHER PUBLICATIONS

Pasternak et al., In–Circuit–Emulation in ASIC Architectural Core Designs, Second Annual IEEE ASIC Seminar, Sep. 1989, pp. 6–4.1–6.4.4.
B. K. Fawcett, "Taking Advantage of Reconfigurable Logic," 1989 Programmable Logic Guide, pp. 17–24.
B. Fawcett, "Logic Analyzer/In–Circuit Emulator," The Programmable Gate Array Data Book, 1988, pp. 6–51.

(List continued on next page.)

*Primary Examiner*—Robert W. Beausoliel, Jr.
*Assistant Examiner*—Glenn Snyder
*Attorney, Agent, or Firm*—Seed and Berry LLP

[57] ABSTRACT

A source-level run-time software code debugging instrument (10) includes target access probe ("TAP") (12) and communications adapter ("COMDAP") (14) that process emulation commands provided by source-level debugging software operating on a host computer. The TAP includes a TAP CPU (28) that receives target CPU input signals and delivers target CPU output signals for controlling the execution of software code by the target circuit in accordance with command signals provided by the host computer. The TAP also includes programmable logic cell array (24) and RAM (34). The TAP logic cell array routes command and data signals to and from the TAP CPU, and the RAM stores an in-circuit emulation ("ICE") program used by the TAP to operate the target circuit. The COMDAP is physically separate from the TAP and provides an interface between the host computer and the TAP. The COMDAP includes a programmable logic cell array (44) and an EPROM (46). The COMDAP logic cell array routes command and data signals to and from the COMDAP, and the EPROM stores the commands for configuring the signal paths within the TAP and COMDAP logic cell arrays and stores the TAP ICE program. A flat cable assembly (16) provides a high-speed signal communications link between the TAP and the COMDAP. The TAP uses certain microprocessor signal features and source-level debugging software that runs on the host computer to provide a software engineer with a fully transparent window into the internal functioning of the TAP CPU while executing code in the target circuit environment.

103 Claims, 8 Drawing Sheets

U.S. PATENT DOCUMENTS

| | | | |
|---|---|---|---|
| 4,809,167 | 2/1989 | Pawloski | 364/200 |
| 4,868,822 | 9/1989 | Scott | 371/16.2 |
| 4,899,306 | 2/1990 | Greer | 364/900 |
| 4,924,382 | 5/1990 | Shouda | 364/200 |
| 4,964,074 | 10/1990 | Suzuki | 364/900 |
| 5,047,926 | 9/1991 | Kuo | 364/200 |
| 5,053,949 | 10/1991 | Allison | 364/200 |
| 5,056,013 | 10/1991 | Yamamoto | 371/16.2 |
| 5,068,852 | 11/1991 | Locke | 371/16.2 |
| 5,073,968 | 12/1991 | Morrison | 395/500 |
| 5,077,657 | 12/1991 | Cooper | 395/500 |
| 5,109,353 | 4/1992 | Sample | 371/22.2 X |

OTHER PUBLICATIONS

Majewski, et al., "Emulator kit multiplies microprocessor choices," 30 Electronic Design, 117–122 (Nov. 25, 1982).

Falk, "Emulators keep pace with chip speeds and complexity," 26 Computer Design, 31–38 (May 15, 1987).

Everett, "In-circuit emulators keep pace with 16- and 32-bit πPS," 32 EDN–Electrical Design News, 252–258 (Jul. 23, 1987).

Balthasart, "Development of a low cost emulator for microprocessor Z 80," 95 Bulletin Scientifique No. 4, Association des Ingenieurs Electriciens sortis de L'Insitut Electrotechnique Montefiore, 131–136 (1982).

Santoni, "Instruments," 26 EDN–Electrical Design News, 212–224 (Jul. 22, 1981).

Yen, "Fast emulator debugs 8085-based microcomputers in real time," 50 Electronics, 108–112 (Jul. 21, 1977).

The Microsystem Analyzer, Millennium Systems, Inc., Cupertino, CA.

Millennium Guide To Testing Microprocessor Based Systems and Boards, Millenium Systems, Cupertiono, CA.

Millennium Diagnostic Programming For Microprocessor–Based Systems, Millennium Systems, Cupertino, CA.

Millennium Programming With SA Microsystem Analyzer, Millenniium Systems, Cupertiono, CA.

Millennium, Microsystem Analyzer, Users Manual Millennium Systems, Inc., Cupertino, CA.

Millennium Product Catalog, Millennium Systems, Inc., Cupertino, CA.

ICE–386 DX In –Circuit Emulator User's Guide For DOS Systems, By Intel Corporation (EK 1–3), Dec. 00, 1988.

Selected Pages, ICE–386 DX In–Circuit Emulator Installation Supplement For DOS Systems, By Intel Corporation (EK 4–7), Dec. 00, 1988.

Features Sheet For 8088 Single Board Emulator (SBE–88), By Huntsville Microsystems, Inc. (EK 8–9), 1986.

Pages From 8088 Single Board Emulator User's Manual (SBE–88), By Huntsville Microsystems, Inc (EK 10–13), 1986.

Feature Sheet For Emul51–PC Development System For The 8051 Family, By Nohau (EK 115–117), Undated.

*Electronic Design* Article Titled "Development Tool Trouble–Shotts Pgas In The Target System" (EK 119–122), Jan. 26, 1989.

Pages Of Book Ice–85 MCS–In–Circuit Emulator, By Intel Corp. (EK 123–126), 1978.

Feature Sheet For Mice–V–486, The First True 486 In–Circuit Emuolator, By Microtek (EK 127), Undated.

Development Systems Handbook, By Intel Corp. (EK 129–137), May 1983.

Intel 386 Family In–Circuit Emulators, By Intel Corp. (EK 138–149), Jul. 1990.

Excerpt From *Personal Engineering & Instrumentation News* Article Re Low–Cost Emulators (EK 150), Nov. 00, 1992.

Excerpt From Zilinx Databook Re Reconfigurable Logic, And Showing Mesa—1, And Bibliography (EK 151), 1989.

8088 Single Board Emulator (SBE–88), By Huntsville Microsystems Feature Sheet (EK 152–153), Undated.

6809 Single Board Emulator (SBE–09), By Huntsville Microsystems Feature Sheet (EK 154), Undated.

Advance Information 80386 High Performance Microprocessor With Integrated Memory Management, By Intel Corp. (EK 155–156), Oct. 1985.

Intel 386 Family In–Circuit Emulator, By Intel Corp. (EK 157–160), Nov. 1988.

Technical Data For The HP 64430 Emulation/Analysis Support For Motorola 68030 Microprocessors, By Hewlett Packard (EK 161–172), Mar. 1990.

Technical Data For The HP Emulation and Analysis Support For Motorola 68020 and 68030 Microprocessors, By Hewlett Packard (E 173–184), Mar. 1990.

Technical Data For The HP 64773A/AL Emulator/Analyzer For AT&T We DSP32C Digital Signal Processor, By Hewlett Packard (EK 185–192), Jul. 1990.

Technical Data For The HP Emulators And Development Solutions For 80286/C286, 80C186/C188/186/188, 80C86/C88/86/88 Microprocessors, By Hewlett Packard (EK 193–204), May 1991.

$d^2$ICE–51 In–Circuit Emulator For 8051S, By Cybernetic Microsystems (EK 212), Oct. 1988.

*Electronic Design* Article Titled "PLD Designers Benefit From Better Tools" (EK 221–226), Apr. 27, 1989.

*Computer Design* Article Titled "PC–Based PCB Design Tools Move Into Workstation Turf" (EK 226–230), Jan. 1, 1989.

ES 1800 Emulator, By Intel Corp. (EK 244–245), Undated.

AN196–MC Real–Time Emulator, By Annapolis Micro Systems (EK 246), Undated.

Mesa–1 In–Circuit Verifier, By Data I/O (EK 247–250), 1989.

EL 800 Series For 8–Bit Microprocessor Development Tools For The Z80 Family Z180, And HD64180 Microprocessors, By Applied Microsystems (EK 255–258), Jul. 1989.

ICE 386/25 User's Guide (2433DOC932–1491), Dec. 1988.

ICE 386/25 Installation Supplement (2433DOC167–252), Dec. 1988.

ICE 386/DX Installation Supplement (2433DOC1492–1600), Dec. 1988.

ICE 386/25 Specification Sheet (2433DOC0161–162), Jan. 1989.

ICE 386/SX Specification Sheet (2433DOC0163–164), Jan. 1989.

ICE 386 Developmental Solutions Packet (2433DOC2474–2985), Jan. 1988.

ICE 386SX User's Guide (2433DOC0253–748), Aug. 1988.

EL 3200 Advertisement (2432DOC01–05), 1989.

SOURCE-LEVEL RUN-TIME SOFTWARE CODE DEBUGGING INSTRUMENT

This application is a continuation of application Ser. No. 08/035,669 filed May 23, 1993, which is a continuation of application Ser. No. 07/521,261, filed May 9, 1990, now U.S. Pat. No. 5,228,039.

TECHNICAL FIELD

The present invention relates to techniques for correcting or "debugging" computer software code and, in particular, to a source-level run-time software code debugging instrument using microprocessor emulation technology.

BACKGROUND OF THE INVENTION

There are currently two conventional techniques used by programmers to debug computer software code. These techniques include program monitors and microprocessor emulators.

A program monitor is intrusive software code located in target memory to debug computer programs. The program monitor operates in conjunction with and monitors the operation of a main computer program that controls the functions of a microprocessor-based target circuit. The program monitor code is intrusive in that it is linked to the main program code, both of which are either downloaded into memory sites provided in the target circuit or stored in a read only memory (ROM) used by the programmer. The use of a monitor program requires that a universal asynchronous receiver-transmitter or other communication hardware be provided in the target circuit so that the monitor can communicate apart from the main program to the programmer.

The use of program monitors is advantageous because they are relatively inexpensive and find the majority of errors or "bugs" located in the main program. One drawback of program monitors is that they require the use of resources in the target circuit and typically are ineffective in detecting more difficult problems present in the associated program code.

An emulator is a nonintrusive software debugging tool that uses external hardware to provide transparent operation of a microprocessor embedded in a target circuit. The emulator microprocessor substitutes for the target microprocessor during target circuit testing and execution, and the emulator traces all activity that occurs at the target microprocessor input and output terminals. An emulator provides a complex breakpoint system that monitors the target microprocessor activity and stops the microprocessor operations at predetermined points for analysis of certain target circuit signals.

An emulator is designed for use primarily in full system integration and for solving real-time problems. A programmer using an emulator is able to replace the programmer's ancillary ROM with an overlay random access memory (RAM) located in the emulator. The overlay RAM allows the programmer to debug the program code even when the target circuit is not complete physically and thereby shortens the development time of microprocessor-embedded circuits. Certain types of emulators do not require the use of the target resources; therefore, such emulators can be viewed as nonintrusive code debugging instruments.

An emulator addresses the needs of the integration phase and time-dependent problems in a target circuit by using a trace feature, complex breakpoint systems, and an overlay memory. Because each of these features is expensive but critical for full system integration, such features are not necessary for run-time debugging. Thus, one major drawback of emulators is that they are relatively expensive, thereby making them inaccessible to a significant percentage of the growing number of software engineers participating in microprocessor-based circuit design tasks.

SUMMARY OF THE INVENTION

An object of the present invention is, therefore, to provide cost-effective early access to a microprocessor-embedded target computer system for software debugging by a programmer.

Another object of the invention is to provide a software code debugging instrument that allows the shortening of development time for microprocessor-embedded target computer systems.

A further object of the invention is to address the increasing ratio of software engineers to hardware engineers and to shorten the time-to-market by cost-effectively providing each member of a software design team with a run-time code debugging instrument.

Yet another object of the invention is to provide a cost-effective transparent run-time instrument that need not require the use of target resources to function.

The present invention is a source-level run-time software code debugging instrument that uses emulation technology. The invention fills a void in the microprocessor-based circuit development cycle because it is a cost-effective, transparent run-time software debugging instrument that need not use the target resources required by a monitor and does not provide the complex, expensive debugging features present in an emulator.

A preferred embodiment of the present invention includes a target access probe ("TAP") subsystem and a communications adapter ("COMDAP") subsystem that process emulation commands provided by a host analysis code source such as source-level debugging software operating on a host computer. The TAP includes a microprocessor or central processing unit ("CPU") that receives target CPU input signals and delivers target CPU output signals for controlling the execution of software code by the target circuit in accordance with command signals provided by the host computer. The command signals from the host computer formulate operating instructions that the TAP CPU receives and decodes to cause the target circuit to produce a desired response. The TAP also includes a first programmable logic cell array and a RAM. The first programmable logic cell array routes command and data signals to and from the TAP CPU along signal paths established to assemble such signals in a digital word format that is compatible to the specific type of TAP CPU in use. The RAM stores an in-circuit emulation ("ICE") program used by the TAP to operate the target circuit whenever the TAP assumes target circuit control.

The COMDAP, which is physically separate from the TAP, provides an interface between the host computer and the TAP. The COMDAP includes a second programmable logic cell array and an erasable programmable ROM ("EPROM"). The second programmable logic cell array routes command and data signals to and from the COMDAP along signal paths established to assemble such signals in a digital word format that is compatible with the specific type of host analysis code source and TAP in use. The EPROM stores the commands for configuring the signal paths within the first and second programmable logic cell arrays and stores the TAP ICE program, which is transferred to the TAP RAM upon initial application of electrical power to the debugging instrument.

A flat cable assembly provides the necessary signal communications link between the TAP and the COMDAP. The use of the EPROM in conjunction with the first and second programmable logic cell arrays in the TAP and COMDAP, respectively, allows a software engineer to provide software code that configures the TAP for a particular type of microprocessor and the COMDAP for a particular type of host analysis code source.

The present invention differs from a software monitor in that the former monitors and controls the execution of code in the target circuit without requiring prior code modification or without using target memory or input-output circuitry. The present invention includes RAM sites on the TAP and EPROM sites on the COMDAP, thereby eliminating the use of target RAM or ROM space. Equipping the debugging instrument with the COMDAP eliminates the need for use of a target universal asynchronous receiver-transmitter or other communication hardware.

Because of certain microprocessor signal features used by the TAP, source-level debugging software that runs in the host computer provides the software engineer with a fully transparent window into the internal functioning of the TAP CPU while executing code in the target circuit environment. This window into the TAP CPU combined with powerful source-level debugging software provides a software engineer with the capability of solving run-time problems. A preferred source-level debugging software package facilitates ready access to data structures, arrays, dynamic variables, and data breakpoints. The software engineer can read data from and write data to specific target locations as well as transmit register states and other data to the debugging program for display to the software engineer. The software engineer can also download and upload code, execute code starting at a preset value, and stop code at a preset value. A software engineer may use target interrupt resources depending on target circuit CPU being emulated.

Additional objects and advantages of the present invention will be apparent from the detailed description of a preferred embodiment thereof, which proceeds with reference to the accompanying drawings.

BRIEF DESCRIPTION OF THE DRAWINGS

is a functional block diagram of the TAP subsystem of the present invention.

DETAILED DESCRIPTION OF PREFERRED EMBODIMENT

Figure 1:
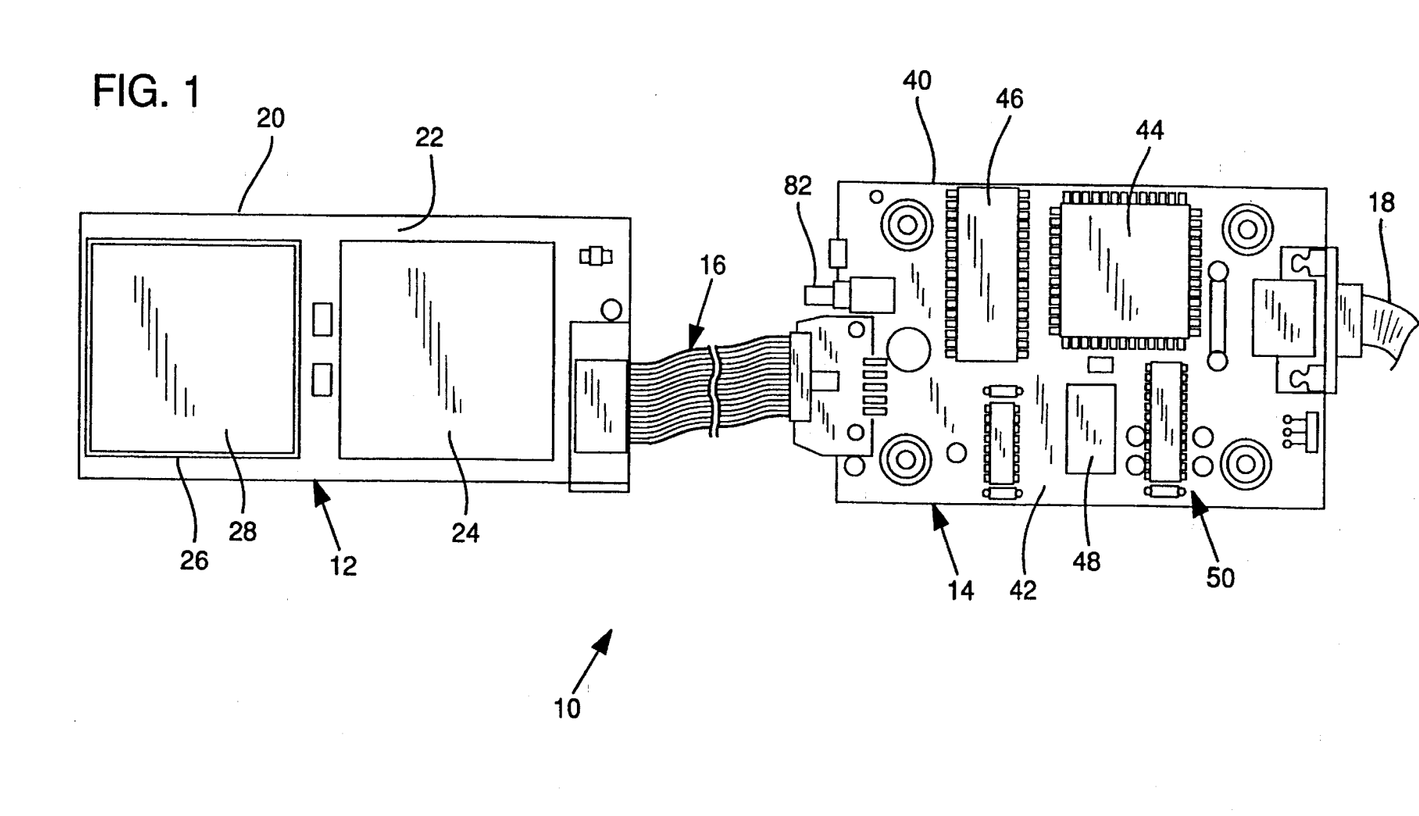
FIG. 1 is a pictorial view of the software code debugging instrument of the present invention, which includes target access probe ("TAP") and communications adapter ("COMDAP") subsystems connected by a flat cable assembly.

FIG. 1 is a pictorial view of a preferred embodiment of software code debugging instrument 10 of the present invention. Debugging instrument 10 includes a target access probe ("TAP") subsystem 12 and a communications adapter ("COMDAP") subsystem 14 interconnected by a detachable flat cable assembly 16. COMDAP 14 receives command signals transmitted on a RS-232 serial communications link 18 from a host analysis code source or host computer (not shown) on which a fully integrated windowed debugging software program operates. Communications link 18 is preferably of the RS-232 type because standard computer terminals use a communications protocol defined by EIA standard RS-232 to send and receive data from a control computer. COMDAP 14 conditions the command signals for delivery through the conductors of cable assembly 16 to TAP 12.

Figure 2:
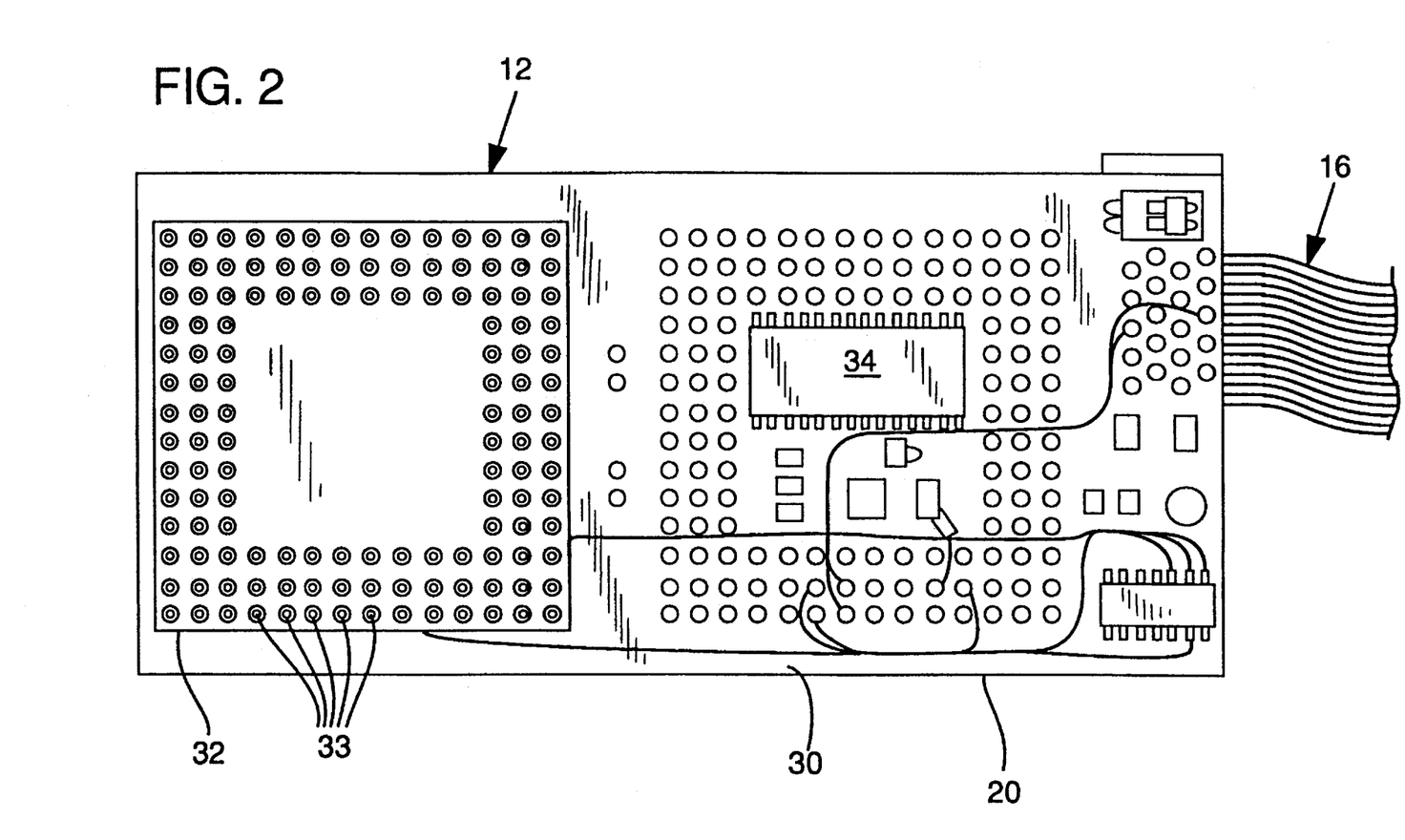
FIG. 2 is an enlarged view of the lower side of the TAP, the upper side of which is shown in FIG. 1.

TAP 12 includes a printed circuit board 20 that carries on its upper surface 22 a first programmable logic cell array 24 and a first socket 26 that receives the lead pins of a microprocessor or central processing unit ("CPU") 28. Socket 26 is affixed to conductive regions of circuit board 20 by solder pads associated with different ones of the microprocessor lead pins. Printed circuit board 20 carries on its lower surface 30 a second socket 32 having multiple downwardly depending pins 33 (FIG. 2) that connect by electrically conductive paths through circuit board 20 to the solder pads of socket 26 and can be inserted into a female target CPU socket on the target circuit board (not shown). Printed circuit board 20 also carries on its lower surface 30 a random access memory ("RAM") 34. Programmable logic cell array 24 establishes signal flow paths necessary to provide data and address signals in the proper digital word format to CPU 28 and RAM 34. CPU 28 substitutes for and plugs into the socket receptacles dedicated for a CPU on the target circuit board, and RAM 34 functions as the in-circuit emulation ("ICE") program memory for TAP 12 when it takes control c target circuit operation.

COMDAP 14 includes a printed circuit board 40 that carries on its upper surface 42 a second programmable logic cell array 44 and an erasable programmable read only memory ("EPROM") 46. COMDAP 14 also includes a 30 MHz crystal oscillator 48 and associated frequency divider circuitry 50 that provide clock signals to programmable logic cell arrays 24 and 44 to enable high-speed serial command and data transfer between TAP 12 and COMDAP 14 through cable assembly 16.

TAP 12 and COMDAP 14 are preferably physically separate so that TAP 12 can be used with COMDAPs 14 adapted for use with host computers of different types and so that COMDAP 14 can be used with TAPs 12 adapted for use with CPUs 28 of different types. It will be appreciated, however, that TAP 12 and COMDAP 14 need not reside on separate printed circuit boards but may share a common printed circuit board, if desired.

Figure 3:
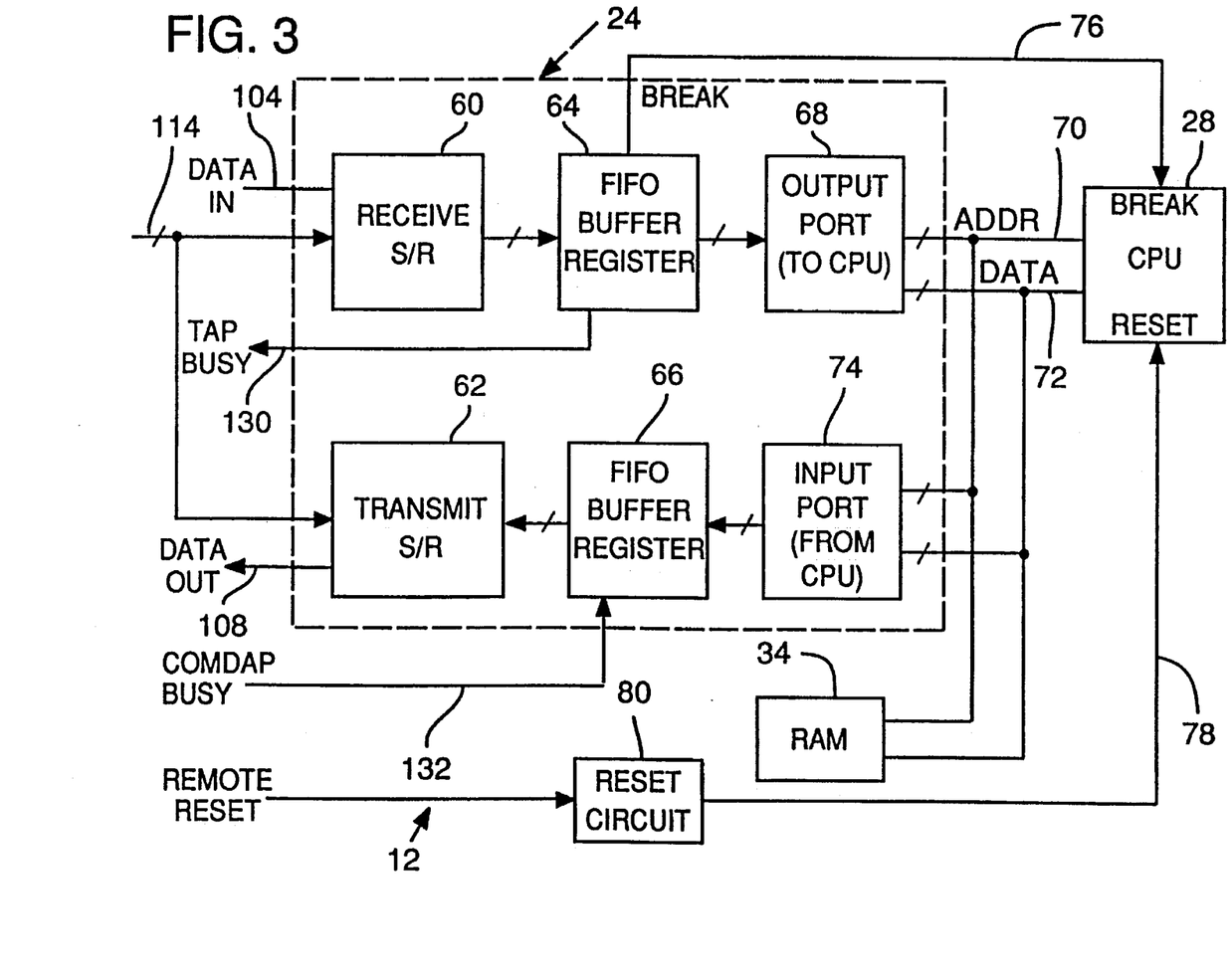

FIG. 3 is a functional block diagram of TAP 12. With reference to FIG. 3, first programmable logic cell array 24 of TAP 12 is configured to have a data receive shift register 60 and a data transmit shift register 62 that respectively receive serial digital commands from and deliver serial digital data to COMDAP 14 through cable assembly 16. One commercially available device suitable for use as logic cell array 24 is a part number XC 3042 logic cell array manufactured by XILINX, Inc., San Jose, Calif. Logic cell array 24 is also configured to have a pair of first-in, first-out ("FIFO") buffer registers 64 and 66, the former receiving serial digital commands from the output of shift register 60 and the latter delivering serial digital commands or data to the input of shift register 62. Logic cell array 24 is configured as described above in accordance with commands stored in EPROM 46 of COMDAP 14 (FIG. 1). Shift registers 60 and 62 assemble the serial digital commands and data received from or delivered to the COMDAP.

An output port register 68 of logic cell array 24 receives the byte wide digital words from FIFO register 64 and provides them as address words and data words of the required length and in the required format for use by CPU 28. These address and data words appear on separate sets of conductors to the respective address bus conductors 70 and data bus conductors 72 of CPU 28. An input port register 74 of logic cell array 24 and RAM 34 receive parallel digital address words and data words from the respective address bus conductors 70 and data bus conductors 72 of CPU 28. Input port 74 reconfigures the address and data information into byte wide format and provides them to FIFO register 66 for delivery to shift register 62 and COMDAP 14. RAM 34 stores the software code representing the ICE program for TAP 12 to perform the debugging function. The contents of RAM 34 are loaded upon initial application of power to TAP 12 as will be described later below. The address bus conductors 70 and data bus conductors 72 are connected to the appropriate address input conductors and data output conductors of RAM 34 to effect operational control of CPU 28 in response to command signals that formulate operating instructions provided by the host computer to debugging instrument 10.

Shift registers 60 and 62 of logic cell array 24 provide digital words to CPU 28 in accordance with the instructions delivered to instrument 10 from the host computer debugging software and provides address words and data words indicative of the results produced by the target software for analysis by the software in the host computer in response to earlier provided instructions. The ICE program software inscribed in RAM 34 effects the proper execution of the instructions delivered to debugging instrument 10 from the host computer.

FIG. 3 shows TAP 12 providing a BREAK signal on a conductor 76 and a RESET signal on a conductor 78 to respective BREAK and RESET inputs of CPU 28. The BREAK signal indicates the receipt by FIFO register 64 of any command from the host computer to stop the execution of the target program by CPU 28. The RESET signal is developed by a RESET circuit 80 in response to a RESET signal generated by a software engineer activating a RESET button 82 (FIG. 1) to reset the target program to its starting address. The BREAK and RESET signals affect the operation of CPU 28 in a manner that is described in detail below.

Figure 4:
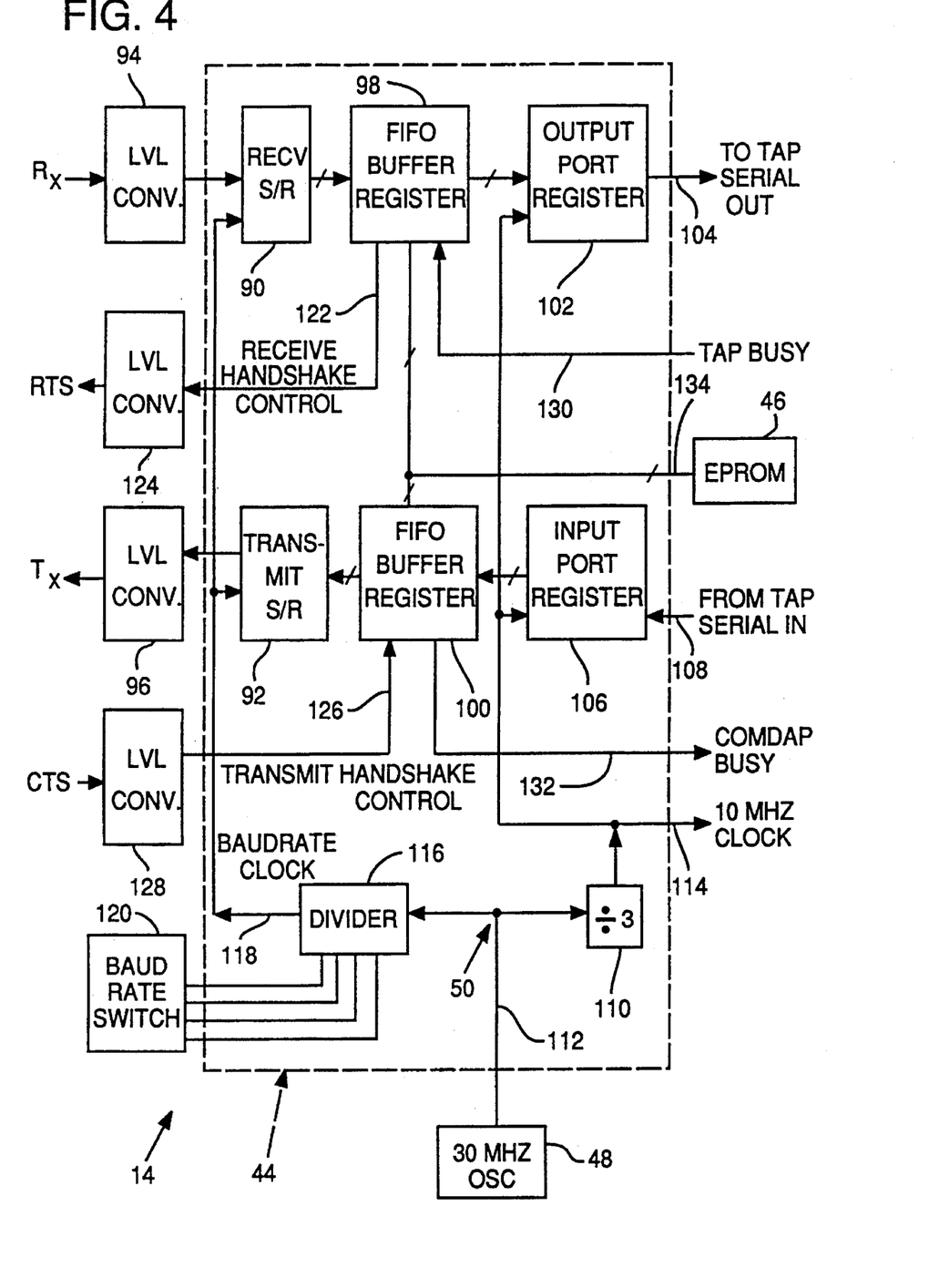
FIG. 4 is a functional block diagram of the COMDAP subsystem of the present invention.

FIG. 4 is a functional block diagram of COMDAP 14. With reference to FIG. 4, second programmable logic cell array 44 of COMDAP 14 is configured to have a data receive shift register 90 and a data transmit shift register 92 that respectively receive serial digital commands from and deliver serial digital data to the host computer through communications link 18. Logic cell array 44 is of a similar type to that of logic cell array 24. A pair of voltage level converters 94 and 96 condition the digital signals respectively received from and transmitted to the host computer.

Logic cell array 44 is also configured to have a pair of FIFO buffer registers 98 and 100, the former receiving byte wide digital commands from the output of shift register 90 and the latter delivering byte wide digital data to the input of shift register 92. Logic cell array 44 is configured as described above in accordance with commands stored in EPROM 46 of COMDAP 14 (FIG. 1). FIFO register 98 temporarily stores the byte wide digital commands received from shift register 90 at a relatively low data rate for delivery to TAP 12 through cable assembly 16 at a relatively high data rate. FIFO register 92 temporarily stores the byte wide digital data received from TAP 12 at a high data rate for delivery to shift register 92 and transmission to the host computer through communications link 18 at a relatively low data rate.

An output port register 102 of logic cell array 44 receives byte wide digital commands from FIFO register 98 and delivers them in serial format at a high data rate on a conductor 104 of cable assembly 16 to data receive shift register 60 of TAP 12. An input port register 106 of logic cell array 44 receives serial digital data from data transmit shift register 62 of TAP 12 at a high data rate on a conductor 108 of cable assembly 16.

The digital commands and data are transmitted in serial format between TAP 12 and COMDAP 14 through the conductors of cable assembly 16 at a 10 Mbps rate. This is accomplished by 30 MHz oscillator 48 and a divide-by-three counter 110 connected to the output 112 of oscillator 48, which together develop a 10 MHz clock signal that is delivered to output port register 102 and input port register 106. The 10 MHz clock signal is also provided on a conductor 114 of cable assembly 16 for delivery to data receive shift register 60 and data transmit shift register 62 of TAP 12. Output 112 of 30 MHz oscillator 48 is also applied to a programmable frequency divider 116 that provides on its output 118 a baud rate clock signal, which is applied to the clock inputs of receive shift register 90 and transmit shift register 92 that, respectively, receive serial commands from and provide serial data to the host computer. The baud rate clock enables COMDAP 14 to receive command signals from and deliver data signals to the host computer at a rate that differs from the 10 Mbps data transfer rate between TAP 12 and COMDAP 14. A manually programmable baud rate switch 120 facilitates the selection of a baud rate that is appropriate to the capabilities of the type of host computer with which COMDAP 14 communicates. A 19.2K baud rate is appropriate for a PC type host computer.

The transmission of command and data signals among the host computer, TAP 12, and COMDAP 14 takes place at different rates. Moreover, commands are assembled in byte wide digital format in TAP 12 for transmission to and from CPU 28. To accommodate the resulting timing differences, coordination of command and data transfer among the host computer, TAP 12, and COMDAP 14 is accomplished by the use of handshake techniques.

FIFO register 98 provides on an output terminal 122 through a voltage level converter 124 a RECEIVE HANDSHAKE CONTROL signal to the host computer, and FIFO register 100 receives on an input terminal 126 through a voltage level converter 128 a TRANSMIT HANDSHAKE CONTROL signal from the host computer. The two handshake control signals coordinate the data transfer between the serial digital signal input and output ports of the host computer and COMDAP 14. FIFO register 98 receives on a conductor 130 of cable assembly 16 a TAP BUSY signal from FIFO register 64 whenever TAP 12 is providing information to or receiving information from CPU 28. Similarly, FIFO register 100 delivers on a conductor 132 of cable assembly 16 a COMDAP BUSY signal whenever COMDAP 14 is processing an instruction and is unavailable for receiving data from data transmit shift register 62 of TAP 12.

EPROM 46 provides on multiple output conductors 134 command signals for configuring the data pathway structures of logic cell arrays 24 and 44 and address and data signals for loading the operations program in RAM 34. All of these functions occur upon initial application of electrical power to debugging instrument 10.

Figure 5:
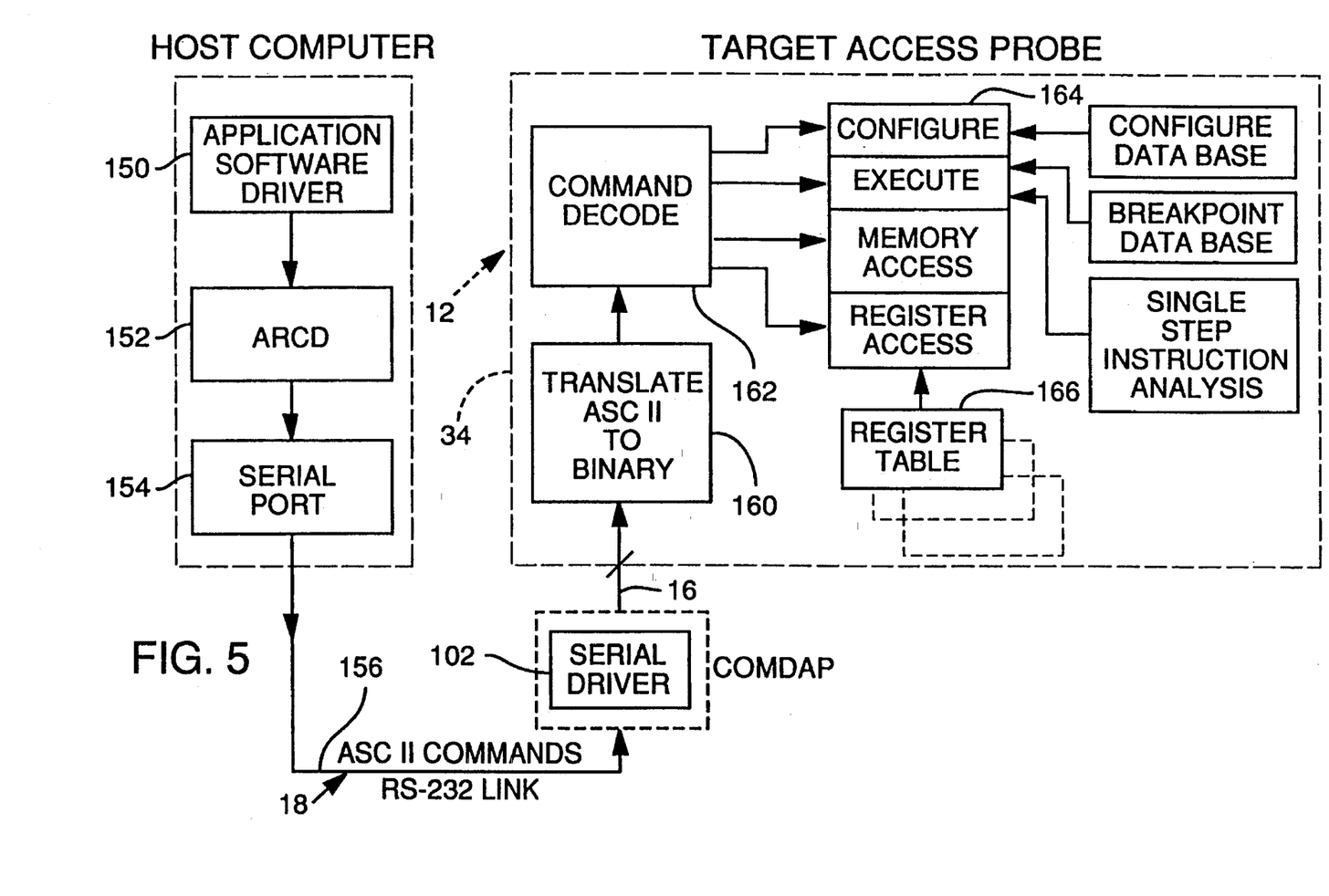
FIG. 5 is a block diagram showing the functions implemented in software used by the present invention to perform microprocessor-based emulation.

FIG. 5 is a block diagram showing the functions implemented in software for processing command signals sent to the target circuit and for processing data signals developed by the target circuit in response to such commands. Debugging instrument 10 operates in association with a host computer that is implemented with windowed, source-level debugging software. The debugging software provides command signals that debugging instrument 10 processes and delivers to a target circuit to provide a software engineer with the capability of solving run-time problems.

A preferred embodiment of debugging instrument 10 is designed for use in debugging a target circuit controlled by an Intel® 80386 32-bit microprocessor. A preferred source-level debugging software program is the VALIDATE®/SoftScope III® 386, which together with Pharlap 386 ASM/Linkloc assembly software, supports Intel OMF-compatible languages, MicroSoft® C, and most compilers. The preferred embodiment of debugging instrument 10 provides a software engineer with a fully transparent window into the internal functioning of the Intel® 80386 microprocessor when executing software code instructions in the target environment.

With reference to FIG. 5, an application software driver 150 of the host computer provides a set of command signals, referred to as a set of "C calls," in accordance with the debugging software applications program. The C calls are delivered to an ASCII Remote Control Driver ("ARCD") 152, which interprets the C calls and conditions them to a format that is compatible for transmission to COMDAP 14. ARCD 152 interprets the C calls as commands having command codes and command fields. A command code is a standard ASCII character (7-bit ASCII code), such as "M" for a memory write command and "m" for a memory read command. The command code may be followed by one or more field codes.

The basic command protocol of ARCD 152 is the receipt of a C call from the host computer and the receipt of a response delivered by debugging instrument 10 from the target circuit. The commands interpreted by ARCD 152 are delivered to a serial port 154 included within the host computer hardware for transmission as serial digital signals on a conductor 156 of the RS-232 communications link 18 to TAP 12 by way of COMDAP 14. The commands received by TAP 12 are processed in accordance with an operations program initially stored in EPROM 46 of COMDAP 14 and transferred to RAM 34 of TAP 12 upon initial application of electrical power.

The ICE program stored in RAM 34 effectively substitutes for the target program provided in the target circuit whenever debugging instrument 10 takes control of the target circuit operation. In FIG. 5, process block 160 represents the translation by the ICE program stored in RAM 34 of a command in ASCII format to binary format for use by the Intel® 80386 microprocessor-based target circuit. Process block 162 represents the decoding of the command, and process block 164 represents various exemplary functions such as configure data base, execute breakpoint data base or single step instruction analysis, access memory, and access register that a particular command could entail. Process block 166 represents the register table assembled specifically for the Intel® 80386 microprocessor, and indicates in broken lines additional separate register tables custom arranged in additional memory space for selective use with microprocessors of different types.

Figure 6:
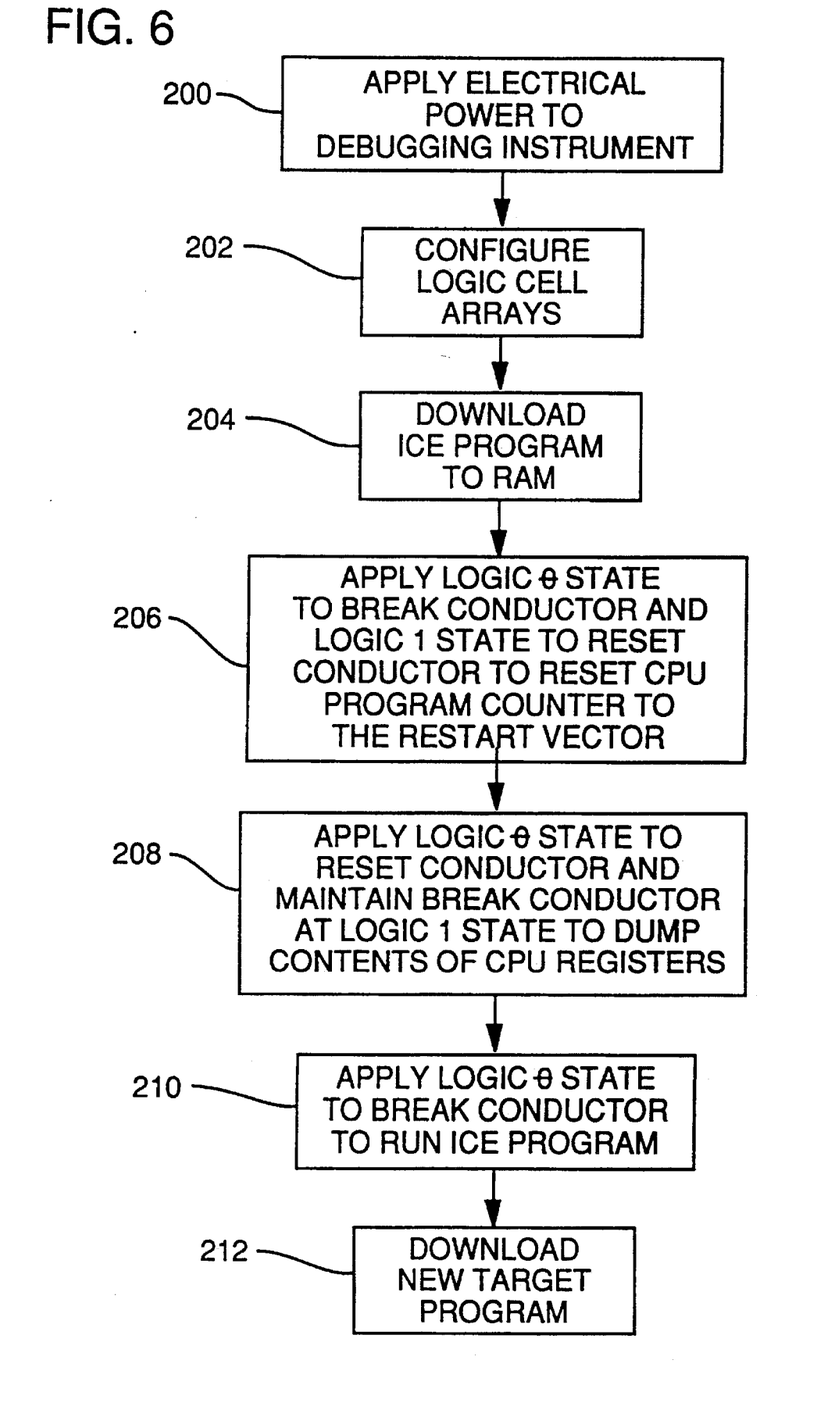
FIG. 6 is a flow diagram showing the processing steps for initially configuring the TAP and COMDAP for operation.

FIG. 6 is a flow diagram showing the sequence of operations debugging instrument 10 carries out to enable debugging of a target circuit. With reference to FIG. 6, process block 200 represents the initial application of electrical power to debugging instrument 10.

Process block 202 indicates that, immediately after application of electrical power, the command signals required to configure logic cell arrays 44 and 24 of COMDAP 14 and TAP 12, respectively, are sequentially read out from the memory sites that correspond to the lowest order addresses (starting at hexadecimal 0000) of EPROM 46.

Once logic cell arrays 24 and 44 are properly configured to operate with the particular host computer and CPU 28 in use, the contents of one-half of the memory sites that correspond to the highest order addresses (hexadecimal 8000-FFFF) of EPROM 46 are downloaded to RAM 34, as indicated by process block 204. The information transfer to RAM 34 is the firmware representing the ICE program of TAP 12. (In a preferred embodiment, EPROM 46 has a 64 K-byte storage capacity but RAM 34 has a 32 K-byte storage capacity, thereby providing TAP 12 with memory expansion capability.) The above-described operations are effected by means of conventional hardware techniques for initializing computer-based electronic circuitry.

Process block 206 represents the application of a logic 1 state on RESET conductor 78 and a logic 0 state on BREAK conductor 76 of CPU 28 to reset its program counter to the restart vector, which is defined in the Intel® 80386 specifications.

Process block 208 indicates the application of a logic 0 state to RESET conductor 78 and a logic 1 state to BREAK conductor 76 will cause CPU 28 to dump the contents of the target CPU registers to ICE memory space in RAM 34, which ICE memory space begins at hexadecimal address 60000. The result is that RAM 34 stores the contents of the target CPU registers before the target operations program has an opportunity to run and before the ICE program runs the target circuit. This allows the software engineer to step through the registers and inspect their contents.

Process block 210 indicates that applying a logic 1 state on BREAK conductor 76 causes CPU 28 to run on the ICE program stored in RAM 34. This assumes a preexisting condition of debugging instrument 10 operating on the target program, which operation requires a logic 0 state on BREAK conductor 76.

Process block 212 indicates that the software engineer can at this stage download a different target program, if the software engineer so desires.

Debugging instrument 10 performs emulation functions on a target circuit controlled by CPU 28, which in a preferred embodiment is an Intel® 80386 32-bit microprocessor. To provide a capability for complete transparency during the emulation process, debugging instrument 10 takes advantage of three signal features provided by emulation hardware integrated within the Intel® 80386 chip (but not bonded out to the CPU pins) and of certain undocumented instructions. Applicants have identified the signal features as IADS, IRDY, and BREAK and have identified the undocumented instructions as LOADALL and four MOV instructions. (The term "undocumented" refers to instructions implemented in the Intel® 80386 microprocessor but not mentioned in its specification sheets.)

The IADS ("in-circuit emulation address strobe") and IRDY ("in-circuit emulation ready") signals implement an additional 4 Gigabyte address space, which is available as an alternative to, and an image of, the normal 4 Gigabyte address space dedicated for use by the software engineer. This additional memory space is referred to herein as "ICE memory space" and represents memory sites in RAM 34. To access ICE memory space, the Intel® 80386 microprocessor generates an IADS signal instead of the documented normal ADS signal. The appropriate ICE memory sites respond to the receipt of the IADS signal by generating an IRDY signal, instead of the documented normal RDY signal dedicated to the target memory system.

There are several ways to cause the Intel® 80386 microprocessor to generate addresses in the ICE memory space. One way is to apply to BREAK conductor 76 a logic 0 state, which suspends execution of the target program and commences execution of instructions stored in ICE memory space at the restart vector, beginning at hexadecimal address FFFFFFF0. Applying a logic 0 state to BREAK conductor 76 also saves in a LOADALL area of ICE memory space the contents of the Intel® 80386 microprocessor registers at the point of transfer to ICE memory space. (This can be considered as a "SAVEALL" instruction for storing the current microprocessor state in the LOADALL area.) Thus, the current microprocessor state in the target program execution remains available for inspection, later resumption of the target program, or modification as desired. The BREAK signal allows, therefore, the software engineer to seize control of the target program.

Executing the undocumented LOADALL instruction, whose opcode is 0F07, transitions the Intel® 80386 microprocessor from ICE memory space to target memory space. Before entering target memory space by executing a LOADALL instruction, breakpoints need to be set to acquire control of CPU 28 at the appropriate time during target code execution. One method is to set software breakpoints, such as an instruction that, when executed, will cause a BREAK to ICE memory space. In the Intel® 80386, this instruction has a single opcode "F1" that when executed saves the target CPU states in the LOADALL area of ICE memory space, as was described above. Another method is to set bit number 12 of the DEBUG register DR7 to a logic 1 state. This causes the hardware breakpoint feature of the Intel® 80386 to BREAK to ICE memory space rather than to target memory space.

Whenever a hardware or software breakpoint occurs, CPU 28 will dump the contents of the CPU internal registers to the LOADALL area, starting at hexadecimal address 60000, and then proceed to the RESTART vector and begin execution.

In summary, executing the LOADALL instruction transitions the Intel® 80386 microprocessor from ICE memory space to target memory space. Effecting a BREAK condition (i.e., executing SAVEALL) causes storage of the entire state of the Intel® 80386 microprocessor in the LOADALL area of ICE memory space. The target program can be resumed by executing the undocumented LOADALL instruction. Effecting a BREAK condition causes, therefore, a SAVEALL of the microprocessor state to ICE memory address 60000 and begins execution in ICE memory space at FFFFFFF0. The SAVEALL/LOADALL capability of the Intel® 80386 microprocessor loads the entire microprocessor state, including "invisible" descriptor caches, from ICE memory addresses 60000 to 60127.

Table 1 below identifies the hexadecimal addresses for the target CPU register contents stored in the LOADALL area of ICE memory space.

TABLE 1

| Address | Microprocessor Register |
| --- | --- |
| 60000 | CR0 |
| 60004 | EFLAGS |
| 60008 | EIP |
| 6000C | EDI |
| 60010 | ESI |
| 60014 | EBP |
| 60018 | ESP |
| 6001C | EBX |
| 60020 | EDX |
| 60024 | ECX |
| 60028 | EAX |
| 6002C | DR6 |
| 60030 | DR7 |
| 60034 | TR |
| 60038 | LDTS |
| 6003C | GS |
| 60040 | FS |
| 60044 | DS |
| 60048 | SS |
| 6004C | CS |
| 60050 | ES |
| 60054 | TSS Attributes |
| 60058 | TSS BASE |
| 6005C | TSS LIMIT |
| 60060 | IDT Attributes |
| 60064 | IDT BASE |
| 60068 | IDT LIMIT |
| 6006C | GDT Attributes |
| 60070 | GDT BASE |
| 60074 | GDT LIMIT |
| 60078 | LDT Attributes |
| 6007C | LDT BASE |
| 60080 | LDT LIMIT |
| 60084 | GS Attributes |
| 60088 | GS BASE |
| 6008C | GS LIMIT |
| 60090 | FS Attributes |
| 60094 | FS BASE |
| 60098 | FS LIMIT |
| 6009C | DS Attributes |
| 600A0 | DS BASE |
| 600A4 | DS LIMIT |
| 600A8 | SS Attributes |
| 600AC | SS BASE |
| 600B0 | SS LIMIT |
| 600B4 | CS Attributes |
| 600B8 | CS BASE |
| 600BC | CS LIMIT |
| 600C0 | ES Attributes |
| 600C4 | ES BASE |
| 600C8 | ES LIMIT |
| 60100 | Attributes of selector recently loaded |
| 60104 | undefined |
| 60108 | Destination EIP of last JMP FAR |
| 6010C | undefined |
| 60110 | undefined |
| 60114 | undefined |
| 60118 | undefined |
| 6011C | undefined |
| 60120 | undefined |
| 60124 | VEIP Value of virtual EIP |

The information in Table 1 enables the software engineer to examine the state of the CPU registers and alter their contents, if desired.

The four undocumented MOV instructions perform target memory read and write operations from ICE memory address space. A set of possible mnemonics for these four instructions for inclusion in an Intel® 80386 microprocessor disassembler, together with their opcodes and descriptions are summarized below in Table 2.

TABLE 2

| Opcode | Instruction | Description |
|---|---|---|
| 0F10 /r | MVTGT r/m8, r8 | Move Byte to target address r/m |
| 0F11 /r | MVTGT r/m32, r32 | Move Dword to target address r/m |
| 0F12 /r | MVTGT r8, r/m8 | Move Byte from target address r/m |
| 0F13 /r | MVTGT r32, r/m32 | Move Dword from target address r/m |

In Table 2, "/r" specifies the register address and "r/m" specifies the effective address in target memory space. The mnemonic "MVTGT" refers to "MOV to target space," and the terms "Byte" and "Dword" refer to 8-bit data and 32-bit data, respectively. (All addresses are 32 bits in length.) The above instructions work properly in the protect mode of the Intel® 80386 microprocessor. Persons having ordinary skill in the art would appreciate the relationship of these instructions to the operation of the Intel® 80386.

Figure 7:
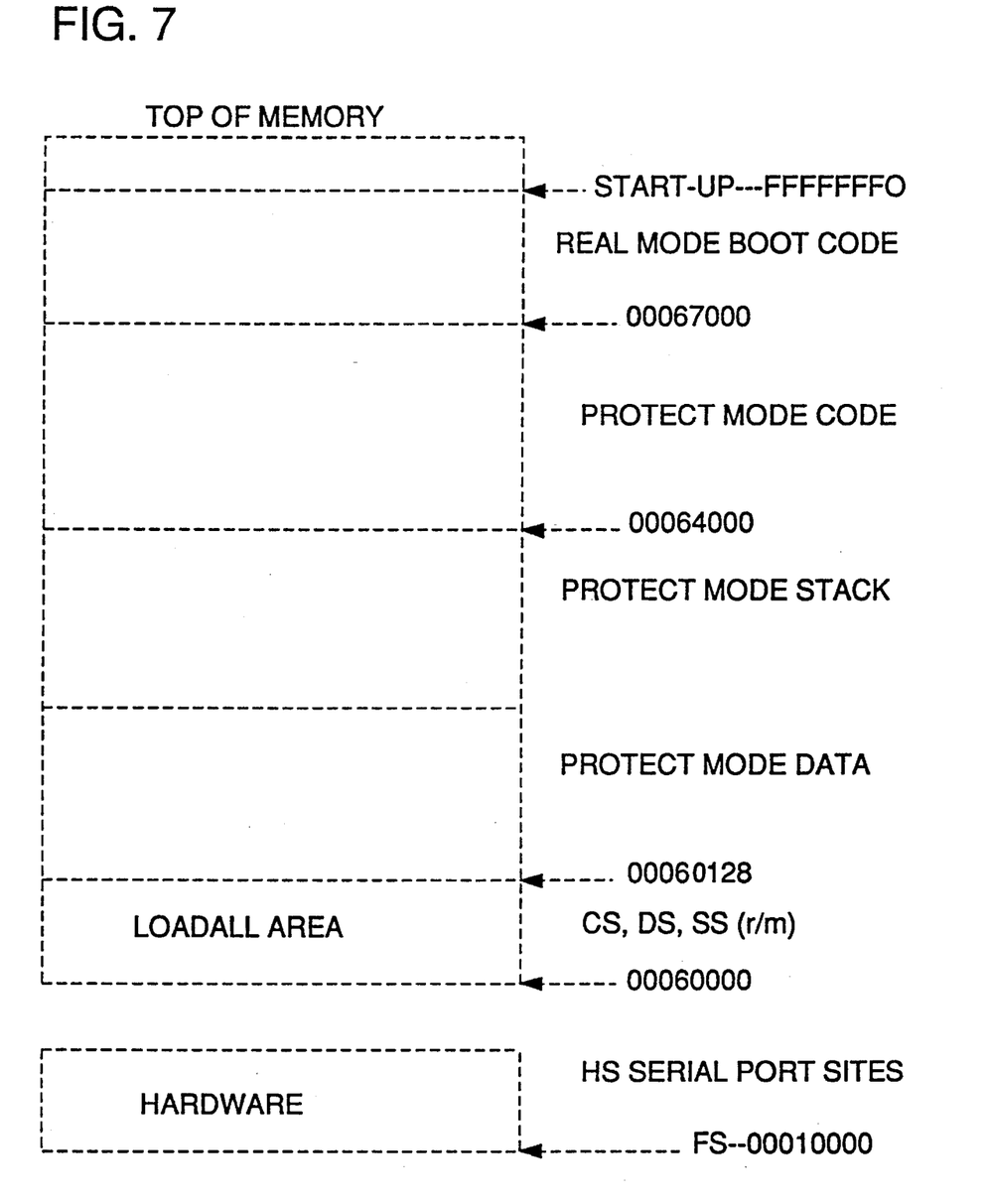
FIG. 7 shows an address map for the RAM included as part of the TAP.

FIG. 7 shows for RAM 34 the memory map summarizing the starting addresses in ICE memory space for information stored in response to execution of the unidentified signal features and undocumented instructions. The address assignments in memory space for protect mode code, protect mode stack, and protect mode data are optional. Other optional address assignments are real mode boot code, which refers to the starting address at initial application of electrical power, and HS ("high-speed") serial port locations, which refer to memory sites from which data and instructions are transferred between the host computer and debugging instrument 10.

Figure 8A:
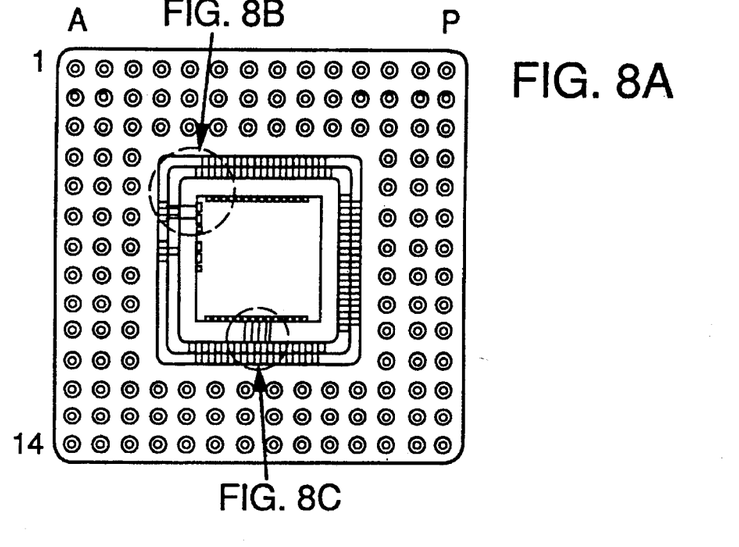
FIG. 8 is a diagram showing certain areas of the topology of the Intel® 80386 microprocessor chip where wire placement is required to bond out three signal features used by a preferred embodiment of the present invention.
Figures 8B, 8C:
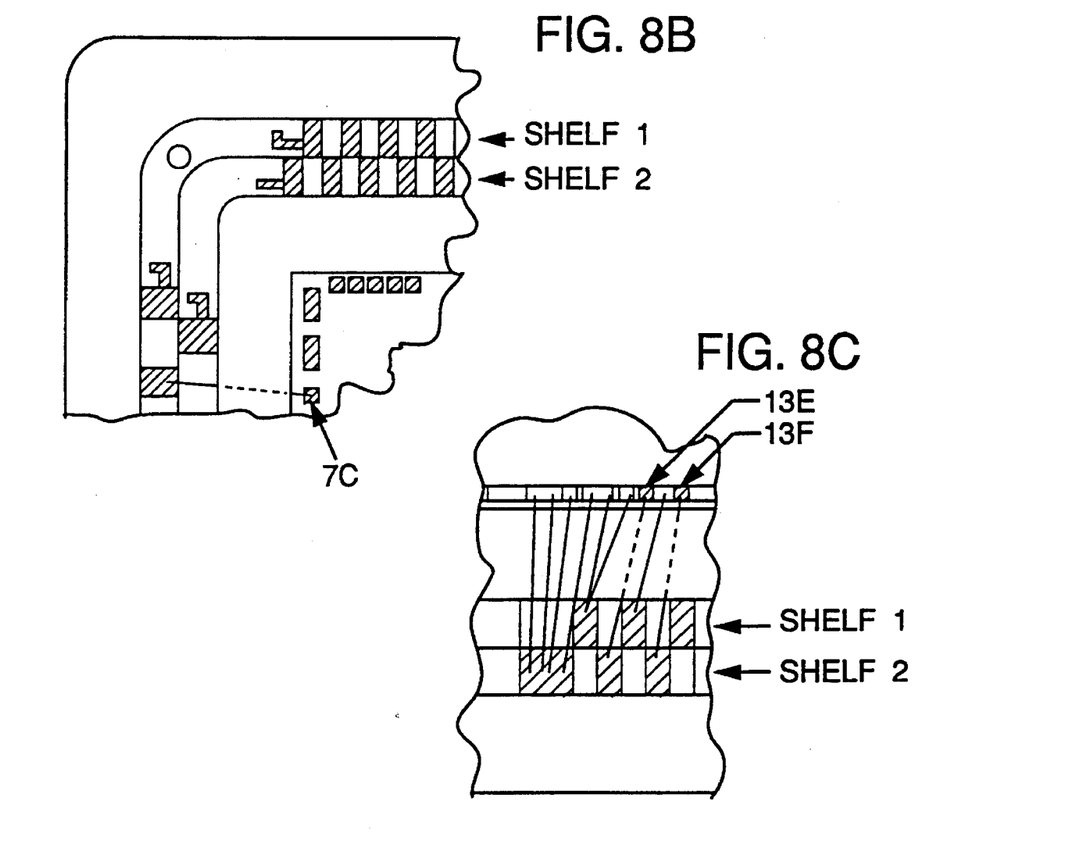

FIG. 8 shows a diagram of the topology of the Intel® 80386 microprocessor chip for accomplishing a bond out of the IADS, IRDY, and BREAK signal features to the CPU pins. With reference to FIG. 8, arrows 13E and 13F in DETAIL C and arrow 7C in DETAIL A designate the areas for placement of bondout wires (shown as broken lines) for the IADS, IRDY, and BREAK signal features, respectively.

It will be obvious to those having skill in the art that many changes may be made to the details of the above-described preferred embodiment of the present invention without departing from the underlying principles thereof. As a first example, the debugging instrument can be adapted for use with target circuits controlled by a CPU other than an Intel® 80386 microprocessor. Depending on the type of CPU, different program instructions may be required to provide the fully transparent window into the internal functioning of the TAP CPU while executing code in the target circuit environment. As a second example, the programmable logic cell arrays may be replaced by individual digital circuit components electrically interconnected to achieve the functions described herein. The scope of the present invention should, therefore, be determined only by the following claims.

We claim:

1. A target access probe ("TAP") for connecting to a target circuit that includes a target CPU communicating with a target program memory having memory sites that store main program instructions for exercising of target circuit components, the target CPU having input and output terminal positions at which respective specified target CPU input and output signals appear, the TAP testing and verifying the operational performance of software, in the target circuit in response to host command signals provided by a host computer in the electrical absence of the target CPU and comprising:

a connector for electrically and mechanically connecting the TAP to the target circuit at the target CPU position, the connector being fixedly mounted on the TAP and being adapted for attachment directly to the target circuit so that the TAP is physically supported by the target circuit;

a TAP CPU receiving target CPU input signals at the input terminal positions and delivering target CPU output signals at the output terminal positions;

in-circuit emulation ("ICE") circuitry including ICE program memory sites that store ICE program instructions, the ICE circuity communicating with the TAP CPU for producing the target CPU output signals in accordance with the ICE program instructions executed by the TAP CPU in response to the host command signals; and an input and output signal link for providing a signal link to and from the host computer and for the target CPU input and output signals, the ICE program memory sites residing wholly outside of the target circuit and the target circuit address space, and the delivery of the target CPU input signals to the corresponding target CPU input terminal positions and the delivery of the target CPU output signals to the corresponding target CPU output positions in response to the host command signals providing a capability for testing and verifying the performance of the target circuit in accordance with the ICE program instructions independently of the target program stored therein.

2. The TAP of claim 10 wherein the TAP further includes a rigid substrate, and wherein the connector, the TAP CPU, and the in-circuit emulation circuitry are physically mounted on the substrate so that the TAP is physically supported on the target circuit by the connector.

3. The TAP of claim 1 wherein the TAP CPU includes emulation specific circuitry specially adapted to perform emulation functions, and wherein the emulation specific circuitry of the TAP CPU is accessible externally of the TAP CPU and coupled to other circuitry on the TAP.

4. The TAP of claim 1 wherein the TAP CPU further performs the function of communicating directly with the host computer to receive the host command signals from the host computer.

5. The TAP of claim 1 wherein the ICE circuitry includes a memory containing at least one ICE program memory site.

6. The TAP of claim 1 wherein the ICE circuitry includes a random access memory containing the ICE program memory sites, and wherein the TAP CPU fetches the ICE program instructions directly from the random access memory.

7. The TAP of claim 1 wherein the TAP CPU is adapted to communicate with both the host computer and the target CPU.

8. The TAP of claim 1 wherein the ICE circuitry includes a memory into which the ICE program instructions are loaded upon initialization of the TAP.

9. The TAP of claim 8 wherein all of the ICE program instructions are loaded upon initialization of the TAP.

10. The TAP of claim 8 wherein multiple ICE program instructions are loaded upon initialization of the TAP.

11. The TAP of claim 8 wherein multiple instructions of the ICE program are loaded upon initialization of the TAP.

12. An instrument for testing and verifying the operational performance of software in a target computer system in the electrical absence of a target CPU having input and output terminal positions at which respective specified target CPU input and output signals appear, the instrument comprising:

a target access probe ("TAP") including a TAP CPU receiving target CPU input signals and delivering target CPU output signals for controlling the execution of software code on the target computer system in accordance with command signals provided by a host analysis code source, the TAP including a connector for electrically connecting the TAP CPU to the target computer system at the target CPU position, the TAP further including a memory storing an in-circuit emulation ("ICE") program containing instructions for the TAP CPU in accordance with the command signals from the host analysis code source, the ICE program residing wholly within the memory and outside both the target computer system and the target computer address space during execution of the ICE program by the TAP CPU, the TAP further including a TAP signal routing integrated circuit for assembling the host command signals into a digital word format and routing the assembled command signals to the TAP CPU;

a communications adapter that provides an interface between the host analysis code source and the TAP; and a data communication link for providing a data communication link between the TAP and the communications adapter.

13. The instrument of claim 12 wherein the connector is fixedly mounted on the TAP and is adapted to plug directly into the target computer system at the target CPU position so that the TAP is physically supported by the target computer system.

14. The instrument of claim 12 wherein the TAP CPU includes emulation specific circuitry specially adapted to perform emulation functions, and wherein the emulation specific circuitry of the TAP CPU is accessible externally of the TAP CPU and coupled to other circuitry on the TAP.

15. The instrument of claim 12 wherein the communications adapter is physically separate from the host analysis code source.

16. The instrument of claim 12 wherein the TAP CPU further performs the function of communicating directly with the communications adapter to receive the command signals from the host analysis code source.

17. The instrument of claim 12 wherein the TAP CPU fetches the instructions of the ICE program directly from the memory.

18. The instrument of claim 12 wherein the TAP CPU is adapted to communicate with both the host analysis code source and the target CPU.

19. The instrument of claim 12 wherein the instructions of the ICE program are loaded into the memory upon initialization of the TAP CPU.

20. The instrument of claim 19 wherein all of the instructions of the ICE program are loaded upon initialization of the TAP CPU.

21. The instrument of claim 19 wherein multiple instructions of the ICE program are loaded upon initialization of the TAP CPU.

22. A target access probe ("TAP") for verifying and controlling the operational performance of software in a target system having a microprocessor position in accordance with instructions from a host analysis code source, comprising:

a first connector for electrically and mechanically connecting the TAP to the target system at the target microprocessor position, the first connector being fixedly mounted on the TAP and being adapted for attachment directly to the target system so that the TAP is physically supported by the target system;

a TAP microprocessor adapted to receive and transmit signals to and from the target system through the first connector;

emulation circuitry adapted to store an in-circuit emulation ("ICE") program and provide instructions to the TAP microprocessor in accordance with instructions from the host analysis code source, the ICE program being stored entirely in the emulation circuitry on the TAP during execution of the ICE program by the TAP microprocessor so that the TAP microprocessor need not fetch instructions from the target system, the target system address space, or the host analysis source code during execution of the ICE program; and a second connector for linking the TAP with the host analysis code source.

23. The TAP of claim 22 in which the ICE program is loaded into the emulation circuitry when power is applied to the TAP.

24. The TAP of claim 23 in which the ICE program is loaded into the emulation circuitry from outside of the TAP.

25. The TAP of claim 22 in which emulation circuitry comprises a random access memory.

26. The TAP of claim 22 wherein the TAP microprocessor includes emulation specific circuitry specially adapted to perform emulation functions, and wherein the emulation specific circuitry of the TAP microprocessor is accessible externally of the TAP microprocessor and coupled to other circuitry on the TAP.

27. The TAP of claim 22 wherein the TAP microprocessor further performs the function of communicating directly with the host analysis code source to receive the instructions from the host analysis code source.

28. The TAP of claim 22 wherein emulation circuitry includes a random access memory containing the ICE program, and wherein the TAP CPU fetches the instructions of the ICE program directly from the random access memory.

29. The TAP of claim 22 wherein the TAP CPU is adapted to communicate with both the host computer and the target CPU.

30. The TAP of claim 22 wherein the emulation circuitry includes a memory into which instructions of the ICE program are loaded upon initialization of the TAP.

31. The TAP of claim 30 wherein all of the instructions of the ICE program are loaded upon initialization of the TAP.

32. The TAP of claim 22 further comprising a signal routing integrated circuit for configuring electrical signals for transmission between the TAP and the host analysis code source.

33. The TAP of claim 32 in which the signal routing integrated circuit is of a programmable type.

34. The TAP of claim 32 in which instructions for programming the signal routing integrated circuit and the ICE program are loaded into the signal routing integrated circuit and the emulation circuitry, respectively, from outside the TAP upon application of power to the TAP.

35. The TAP of claim 32 in which the signal routing integrated circuit is of a reprogrammable type.

36. The TAP of claim 35 in which the signal routing integrated circuit is programmed by instructions received after application of power to the TAP.

37. The TAP of claim 36 in which the signal routing integrated circuit is programmed by instructions received from outside of the TAP.

38. The TAP of claim 35 in which the TAP microprocessor includes a program counter and in which upon application of power to the TAP the signal routing integrated circuit is programmed, the ICE program is loaded into the emulation circuitry, and the program counter is set to a restart vector.

39. The TAP of claim 34 in which the TAP microprocessor includes BREAK and RESET conductors having logic states and in which the BREAK and RESET conductors are set to logic states of reset the program counter to a restart vector.

40. The TAP of claim 39 in which the TAP microprocessor includes CPU registers and in which the RESET conductor and BREAK conductor are set to logic states to dump the contents of the CPU register and the BREAK conductor is then set to a logic state to run the ICE program in the emulation circuitry.

41. An instrument for testing and verifying the operational performance of software in a target computer system in the electrical absence of a target CPU having input and output terminal positions at which respective specified target CPU input and output signals appear, the instrument comprising:

a target access probe ("TAP") including a connector for electrically and mechanically connecting the TAP to the target system at the target CPU position, the connector being fixedly mounted on the TAP and being adapted for attachment directly to the target computer system so that the TAP is physically supported by the target computer system; a TAP microprocessor adapted to receive and transmit signals to and from the target computer system; emulation circuitry adapted to store an in-circuit emulation ("ICE") program that resides wholly within the emulation circuitry and outside of the target computer system and target computer system address space during execution of the ICE program to provide instructions to the TAP microprocessor so that tile TAP itself can function as an emulator in accordance with instructions from a host analysis code source; the microprocessor and emulation circuitry being mounted in a common chassis; and a communications adapter operatively connected to and cooperating with the TAP to provide an interface between the host analysis code source and the TAP to route signals between the TAP and the host analysis code source.

42. The instrument of claim 41 in which the communications adapter includes a memory storing the ICE program and in which the ICE program is loaded into the emulation circuitry upon application of power to the instrument.

43. The instrument of claim 41 in which the TAP further includes a signal routing integrated circuit for configuring signal paths within the TAP and the communications adapter includes a memory storing information for configuring the signal routing integrated circuit.

44. The instrument of claim 41 in which the communications adapter is physically separate from the host analysis code source.

45. The instrument of claim 41 in which the communications adapter is physically separate from the TAP.

46. The instrument of claim 41 wherein the connector is fixedly mounted on the chassis and is adapted to plug directly into the target system at the target CPU position so that the TAP chassis is physically supported by the target system.

47. The instrument of claim 41 wherein the TAP microprocessor includes emulation specific circuitry specially adapted to perform emulation functions, and wherein the emulation specific circuitry of the TAP microprocessor is accessible externally of the TAP microprocessor and coupled to other circuitry on the TAP.

48. The instrument of claim 41 wherein the communications adapter is physically separate from the host analysis code source.

49. The instrument of claim 41 wherein the TAP microprocessor further performs the function of communicating directly with the communications adapter to receive the instructions from the host analysis code source.

50. The instrument of claim 41 wherein the TAP CPU fetches the instructions of the ICE program directly from the emulation circuitry.

51. The instrument of claim 41 wherein the TAP CPU is adapted to communicate with both the host analysis code source and the target CPU.

52. The instrument of claim 41 wherein the instructions of the ICE program are loaded into the emulation circuitry upon initialization of the TAP CPU.

53. The instrument of claim 52 wherein all of the instructions of the ICE program are loaded upon initialization of the TAP CPU.

54. The instrument of claim 52 wherein multiple instructions of the ICE program are loaded upon initialization of the TAP CPU.

55. The instrument of claim 41 in which the tap further includes a reprogrammable signal routing integrated circuit for configuring electrical signals for transmission between the TAP and the host analysis code source communications adapter by way of the communications adapter and in which the communications adapter includes a memory storing configuration information that is loaded into the logic cell array upon application of power to the instrument.

56. A method of configuring a target access probe ("TAP") connected to a microprocessor position of a target system and including a TAP microprocessor, in-circuit emulation ("ICE") circuitry, a TAP signal routing integrated circuit, and a signal link connecting the TAP to a host system, the method comprising:

applying electrical power to the TAP;

configuring the TAP signal routing integrated circuit by applying signals through the signal link to the signal routing integrated circuit;

loading an ICE program into the ICE circuitry by downloading the program through the signal link and the signal routing integrated circuit after the signal routing integrated circuit has been configured; and the ICE program being stored entirely in the ICE circuitry on the TAP during execution of the ICE program by the TAP microprocessor allowing the TAP microprocessor to execute the ICE program from the ICE circuitry.

57. The method of claim 56 in which the TAP microprocessor includes a program counter and registers and further comprising:

setting program counter to a reset vector;

writing the contents of CPU registers to another memory; and running an ICE program.

58. The method of claim 56 in which the TAP communicates with the host analysis source code through a communications adapter and in which downloading the ICE program includes transferring the ICE program from the communications adapter to the ICE circuitry through the TAP signal routing integrated circuit.

59. The method of claim 56 further including the step of maintaining the TAP microprocessor, in a reset condition while the ICE program is being loaded into the ICE circuitry through the signal link and the signal routing integrated circuit.

60. The method of claim 56 wherein multiple instruction bytes of the ICE program are downloaded into the ICE circuitry upon configuring the TAP prior to execution of the ICE program by the TAP microprocessor.

61. The method of claim 56 wherein the entire ICE program is loaded into the ICE circuitry upon configuring the TAP prior to execution of the ICE program by the TAP microprocessor.

62. The method of claim 56 in which the TAP communicates with the host analysis source code through a communications adapter and in which configuring the TAP signal routing integrated circuit and loading an ICE program include transferring data to the TAP from the communications adapter.

63. The method of claim 62 in which the communications adapter includes a communications adapter signal routing integrated circuit and in which configuring the TAP signal routing integrated circuit and loading an ICE program include transferring data through the communications adapter signal routing integrated circuit.

64. The method of claim 63 in which the communications adapter signal routing integrated circuit is of a reprogrammable type and in which transferring data through the communications adapter signal routing integrated circuit includes configuring the communications adapter signal routing integrated circuit.

65. The method of claim 64 in which the communications adapter includes memory sites and in which data for configuring the communications adapter signal routing integrated circuit are stored in the communications adapter memory sites.

66. The method of claim 62 in which the communications adapter includes memory sites and in which the ICE program is stored in the communications adapter memory sites.

67. The method of claim 62 in which the communications adapter includes memory sites in which data for configuring the TAP signal routing integrated circuit is stored in the communications adapter memory sites.

68. An instrument for verifying and controlling the operational performance of software in a target computer system in the electrical absence of a target CPU having input and output terminal positions at which respective target CPU input and output signals appear, the instrument comprising:

a user interface device generating command signals corresponding to manually selected user inputs;

a target access probe including a probe CPU of the same type as the target CPU and an in-circuit emulation memory storing an in-circuit emulation program that resides wholly within the in-circuit emulation memory and outside of the target computer system and the target computer system address space during execution of the in-circuit emulation program by the probe CPU so that the probe CPU need not fetch instructions from the target system or the user interface device during execution of the in-circuit emulation program, thereby allowing the target access probe itself to a function as an emulator, the in-circuit emulation memory providing instructions to the probe CPU in accordance with the command signals from the user interface device;

a signal link connecting the target access probe to the user interface device to allow the target access probe to receive the command signals from the user interface device; and a connector electrically and mechanically connecting terminals of the target access probe to corresponding input and output terminal positions of the target CPU, the connector being fixedly mounted on the target access probe and being adapted for attachment directly to the target computer system so that the target access probe is physically supported by the target computer system.

69. The instrument of claim 68 wherein the target access probe further includes a programmable signal routing circuit that, after being programmed by the user interface device, routes the in-circuit emulation program from the user interface device and downloads the in-circuit emulation program into the in-circuit emulation memory prior to execution by the probe CPU.

70. The instrument of claim 68 wherein the signal link connecting the target access probe to the user interface includes a communications adapter to provide an interface between the user interface device and the target access probe.

71. The instrument of claim 70 wherein the communications adapter is physically separate from the user interface device.

72. The instrument of claim 70 wherein the probe CPU further performs the function of communicating directly with the communications adapter to receive the in-circuit emulation program from the user interface device.

73. The instrument of claim 68 wherein the connector is fixedly mounted on the target access probe and is adapted to plug directly into the target computer system at the target CPU position so that the target access probe is physically supported by the target computer system.

74. The instrument of claim 68 wherein the probe CPU includes emulation specific circuitry specially adapted to perform emulation functions, and wherein the emulation specific circuitry of the probe CPU is accessible externally of the probe CPU and coupled to other circuitry on the target access probe.

75. The instrument of claim 68 wherein the instructions of the in-circuit emulation program are loaded into the in-circuit emulation memory upon initialization of the probe CPU.

76. The instrument of claim 75 wherein all of the instructions of the in-circuit emulation program are loaded into the in-circuit emulation memory upon initialization of the probe CPU.

77. The instrument of claim 75 wherein multiple instructions of the in-circuit emulation program are loaded into the in-circuit emulation memory upon initialization of the probe CPU.

78. The instrument of claim 68 wherein the probe CPU fetches instructions of the in-circuit emulation program directly from the in-circuit emulation memory.

79. The instrument of claim 68 wherein the probe CPU is adapted to communicate with both the user interface device and the target CPU.

80. A method of configuring a target access probe ("TAP") connected to a microprocessor position of a target system and including a TAP microprocessor, in-circuit emulation ("ICE") circuitry, a TAP signal routing integrated circuit, and a signal link connecting the TAP to a host system, the method comprising:

applying electrical power to the TAP;

configuring the TAP signal routing integrated circuit;

loading an ICE program into the ICE circuitry by downloading the program through the signal link and the signal routing integrated circuit; and the ICE program being stored entirely in the ICE circuitry on the TAP during execution of the ICE program by the TAP microprocessor allowing the TAP microprocessor to execute the ICE program from the ICE circuitry.

81. The method of claim 80 further including the step of holding the TAP microprocessor in a reset condition while the ICE program is being loaded into the ICE circuitry.

82. The method of claim 80 in which the TAP communicates with a host analysis source code through a communications adapter and in which downloading the ICE program includes transferring the ICE program from the communications adapter to the ICE circuitry through the TAP signal routing integrated circuit.

83. The method of claim 80 wherein multiple instructions of the ICE program are downloaded into the ICE circuitry upon configuring the TAP prior to execution of the ICE program by the microprocessor of the target system.

84. The method of claim 80 wherein the entire ICE program is downloaded into the ICE circuitry upon configuring the TAP prior to execution of the ICE program by the microprocessor of the target system.

85. A method of configuring a target access probe ("TAP") connected to a microprocessor position of a target system and including a TAP microprocessor, in-circuit emulation ("ICE") circuitry, a TAP signal routing integrated circuit, and a signal link connecting the TAP to a host system, the method comprising:

applying electrical power to the TAP;

configuring the TAP signal routing integrated circuit by applying signals to the signal routing integrated circuit;

loading an ICE program into the ICE circuitry by downloading the program through the signal link and the signal routing integrated circuit; and the ICE program being stored entirely in the ICE circuitry on the TAP during execution of the ICE program by the TAP microprocessor allowing the TAP microprocessor to execute the ICE program from the ICE circuitry.

86. The method of claim 85 in which the TAP communicates with a host analysis source code through a communications adapter and in which downloading the ICE program includes transferring the ICE program from the communications adapter to the ICE circuitry through the TAP signal routing integrated circuit.

87. The method of claim 85 in which the TAP communicates with the host analysis source code through a communications adapter and in which configuring the TAP signal routing integrated circuit and loading an ICE program include transferring data to the TAP from the communications adapter.

88. The method of claim 85 further including the step of holding the TAP microprocessor in a reset condition while the ICE program is being loaded into the ICE circuitry.

89. The method of claim 85 wherein multiple instructions of the ICE program are downloaded into the ICE circuitry upon configuring the TAP prior to execution of the ICE program by the TAP microprocessor.

90. The method of claim 85 wherein the entire ICE program is downloaded into the ICE circuitry upon configuring the TAP prior to execution of the ICE program by the TAP microprocessor.

91. An instrument for verifying and controlling the operational performance of software in a target computer system in the electrical absence of a target CPU having input and output terminal positions at which respective target CPU input and output signals appear, the instrument comprising:

a user interface device generating command signals corresponding to manually selected user inputs;

a target access probe including a probe CPU of the same type as the target CPU, an in-circuit emulation memory storing an in-circuit emulation program that resides wholly within the in-circuit emulation memory and outside of the target computer system and the target computer system address space during execution of the in-circuit emulation program by the probe CPU so that the probe CPU need not fetch instructions from the target system or the user interface device during execution of the in-circuit emulation program, thereby allowing the target access probe itself to a function as an emulator, the in-circuit memory providing instructions to the probe CPU in accordance with the command signals from the user interface device, the target access probe further including a signal routing integrated circuit for routing signals in the target access probe;

a signal link connecting the target access probe to the user interface device to allow the target access probe to receive the command signals from the user interface device; and a connector electrically connecting terminals of the target access probe to corresponding input and output terminal positions of the target CPU.

92. The instrument of claim 91 wherein the probe CPU fetches instructions of the in-circuit emulation program directly from the in-circuit emulation memory.

93. The instrument of claim 91 wherein the probe CPU is adapted to communicate with both the user interface device and the target CPU.

94. The instrument of claim 91 wherein the in-circuit emulation program is loaded into the in-circuit emulation memory upon initialization of the target access probe.

95. The instrument of claim 94 wherein all of the instructions of the in-circuit emulation program are loaded upon initialization of the target access probe.

96. The instrument of claim 94 wherein multiple instructions of the in-circuit emulation program are loaded upon initialization of the target access probe.

97. The instrument of claim 96 wherein the connector is fixedly mounted on the target access probe and is adapted for attachment directly to the target computer system so that the target access probe is physically supported by the target computer system.

98. An instrument for testing and verifying the operational performance of software in a target computer system in the electrical absence of a target CPU having input and output terminal positions at which respective specified target CPU input and output signals appear, the instrument comprising:

a target access probe ("TAP") including a connector for electrically connecting the TAP to the target system at the target CPU position; a TAP microprocessor adapted to receive and transmit signals to and from the target system; emulation circuitry adapted to store an in-circuit emulation ("ICE") program that resides wholly within the emulation circuitry and outside of the target system and target system address space during execution of the ICE program to provide instructions to the TAP microprocessor so that the TAP itself can function as an emulator in accordance with instructions from a host analysis code source; and a TAP signal routing integrated circuit for routing signals in the TAP; and a communications adapter operatively connected to and cooperating with the TAP to provide an interface between the host analysis code source and the TAP to route signals between the TAP and the host analysis code source.

99. The instrument of claim 98 wherein the instructions of the ICE program are loaded into the emulation circuitry upon initialization of the TAP CPU.

100. The instrument of claim 99 wherein all of the instructions of the ICE program are loaded upon initialization of the TAP CPU.

101. The instrument of claim 99 wherein multiple instructions of the ICE program are loaded upon initialization of the TAP CPU.

102. The instrument of claim 98 wherein the TAP CPU fetches the instructions of the ICE program directly from the emulation circuitry.

103. The instrument of claim 98 wherein the TAP CPU is adapted to communicate with both the host analysis code source and the target CPU.

* * * * *